United States Patent [19]

Stürmer et al.

[11] 4,220,842
[45] Sep. 2, 1980

[54] METHOD OF REMOVING MATERIAL FROM A WORKPIECE

[75] Inventors: Ekkehard Stürmer, Uetendorf; Bernhard Einstein, Kehrsatz, both of Switzerland

[73] Assignee: Lasag AG, Thun, Switzerland

[21] Appl. No.: 839,812

[22] Filed: Oct. 6, 1977
(Under 37 CFR 1.47)

[30] Foreign Application Priority Data

Oct. 7, 1976 [CH] Switzerland ............... 12737/76

[51] Int. Cl.² .................................. B23K 9/00
[52] U.S. Cl. ......................... 219/121 LM; 219/121 L
[58] Field of Search .................. 219/121 L, 121 LM

[56] References Cited

U.S. PATENT DOCUMENTS

| | | | |
|---|---|---|---|
| 3,473,000 | 10/1969 | Siebman et al. | 219/121 LM |
| 3,485,996 | 12/1969 | Chiou et al. | 219/121 LM |
| 3,710,798 | 1/1973 | Bredemier | 219/121 L X |
| 4,023,005 | 5/1977 | Bolin | 219/121 LM |
| 4,078,167 | 3/1978 | Banas et al. | 219/121 X |
| 4,122,240 | 10/1978 | Banas et al. | 219/121 X |

*Primary Examiner*—B. A. Reynolds
*Assistant Examiner*—Mark Paschall
*Attorney, Agent, or Firm*—Brady, O'Boyle & Gates

[57] ABSTRACT

A pulsed infrared laser has an optical system for focusing the laser beam impulse, positioning a metallic workpiece to be drilled at the waist of the beam or at a spacing in the propagation direction in front of the waist of the laser beam, surrounding the portion of the workpiece from which metal is being removed with an atmosphere containing helium and/or hydrogen during the removal process, forming an expanding plasma in front of the portion of the workpiece to be drilled which absorbs the laser radiation at the start of the laser beam impulse by focusing the laser beam impulse at a large aperture angle and dimensioning the timewise intensity course of the laser beam impulse, and maintaining the expanding plasma only during a fraction of the laser beam impulse to remove material from the workpiece.

23 Claims, 6 Drawing Figures

METHOD OF REMOVING MATERIAL FROM A WORKPIECE

This invention relates to a method of removing material from a metallic workpiece, more especially drilling, by means of a focused laser beam impulse of a pulsed infrared laser, more especially a $CO_2$-laser.

The drilling of metallic workpieces by means of laser beams, more especially from a $CO_2$-laser, is made difficult by the high degree of reflection of metallic surfaces, because the greater part of the laser radiation impinging on the workpiece is reflected and only a slight proportion is used for heating-up the location to be processed. Therefore, high laser intensities are necessary for drilling metallic workpieces. This applies more especially to applications in which heating-up of the environment of the work zone through heat conduction has to be avoided and therefore work has to be effected with short laser impulses, for example, from a TEA-$CO_2$-laser. However, drilling tests on metallic workpieces by means of $CO_2$-lasers have shown that, in the case of infrared laser impulses of high intensity, there is formed, in front of the workpiece, an LSD-wave which absorbs the radiation before it encounters the workpiece. Infrared lasers, more especially $CO_2$-lasers, have therefore, in the past, been considered as unsuitable for the removal of material from metallic workpieces, or the achieved efficiency of removal has been considered inadequate.

The problem underlying the invention is, by means of an infrared laser impulse, more especially of an impulse produced with a $CO_2$-laser, to remove material with high efficiency from a metallic workpiece, or to shorten the time needed for the removal of a specific mass of material. Understood by "efficiency" in this respect is the ratio of the volume of the removed material to the energy of the laser beam impulse.

In accordance with the invention, this problem is solved in that the surface of the location, to be processed, of the workpiece is arranged in the beam waist of a focused laser beam impulse or at a spacing, in the propagation direction of the laser beam impulse, in front of the beam waist and is surrounded with an atmosphere which contains helium and/or hydrogen, and the timewise intensity course of the laser beam impulse is so dimensioned and the laser beam impulse is focused at such a large aperture angle that an expanding plasma which absorbs the laser radiation is formed at the start of the laser beam impulse in front of the location to be processed, but is maintained only during a fraction of the laser beam impulse.

To achieve maximum efficiency, the surface of the location to be processed of the workpiece is prefereably arranged at a spacing d in the propagation direction of the laser beam impulse in front of the beam waist, in which respect, at least approximately:

$$d = k \cdot w / tg\, a$$

where $k = 0.1$ to $2.0$, w is the radius of the beam waist and a is the aperture angle of the focused laser beam impulse. For k, advantageously $k = 0.2$ to $1.0$, for example, $k = 0.7$ is selected.

To be understood by "the aperture angle a" of the focused laser beam impulse, is the angle which the optical axis forms with the conical part of the envelope of the converging laser beam impulse. The beam waist is the narrowest point of the envelope of the focused laser beam impulse. In the case of a laser beam emitted by the infrared laser with the aperture angle of zero, the beam waist lies in the focal plane of the focusing optical system focusing the laser beam impulse. The radius w of the beam waist is (similarly to the radius of a laser beam) defined as the radius of the circle around the beam axis through which 86% of the laser output is transmitted.

An absorbing expanding plasma is also designated as an LSD-wave (Laser-Supported-Detonation-wave). The LSD-wave is a shock wave which is formed from a plasma and which is maintained (supported) by absorption of laser radiation and which is propagated (expands) at supersonic speed towards (or against) the propagation direction of the laser radiation. (See, for example, P. E. Nielsen and G. H. Canavan, "Laser Interaction and Related Plasma Phenomena", Vol. III, H. J. Schwarz and H. Hora, Plenum Press New York, 1974, page 177 et seq.)

The method in accordance with the invention has come from an exhaustive study of the physical processes in the case of the interaction of infrared laser radiation of a $CO_2$-laser with metals. Experiments within the framework of the invention allow, in the case of a laser beam impulse dimensioned in accordance with the invention, a material removal process proceeding in the following phases to be presumed: Upon the impulse rise of the laser impulse, the material surface (or impurities embedded therein) lying in or in front of the beam waist is so heated that thermoomission of electrons occurs. These absorb laser energy through inverse deceleration radiation and multiply through ionisation through impact. Upon reaching a specific intensity density directly in front of the location to be processed, they form a plasma which almost completely absorbs the following radiation impulse part and in so doing, is severely heated up. The hot plasma heats more especially through heat conduction, the uppermost layer of the material to be removed right into the surroundings (or region) of the melting point. This heating-up of the uppermost layer of the material to be removed by the plasma which absorbs the laser radiation, is essential for the material removal in accordance with the invention, because the laser beam impulse, on account of the high degree of reflection of the metal surface, is only weakly absorbed by this and therefore, not able to heat it up effectively. The plasma expands after its formation out of the region in front of the location to be processed, in which respect it forms an LSD-wave, which moves away at a speed of about 1 cm/$\mu$s from the surface of the location to be processed. The plasma therefore rapidly loses heat contact with the workpiece, so that the heating-up of the location to be processed is interrupted. As long as the LSD-wave is disposed in a region of the focused laser radiation in which the intensity thereof rises above a specific threshold, it is maintained by the laser radiation; in other words, absorbs this so that no, or only a slight, material removal is effected. In accordance with the invention, now the timewise intensity course of the laser beam impulse is so dimensioned and the aperture angle chosen so large that the LSD-wave is maintained only for a fraction of the laser beam impulse. By using a sufficiently large aperture angle, the result is achieved that the LSD-wave passes rapidly out of the region in front of the beam waist into regions of lower intensity in which the LSD-wave is extinguished, i.e. becomes transparent for the laser radiation, the timewise intensity course being so selected that an LSD-wave is not formed anew. Through a short rise time of the laser beam impulse and a high peak intensity, i.e. through a rise by leaps and bounds of the timewise intensity course of the laser beam impulse to a high peak intensity and a subsequent drop in the intensity, in this respect, a particularly rapid extinguishing of the LSD-wave can be achieved. Since the gas density directly in front of the location to be processed has been severely reduced in the train of the LSD-wave, after the extinguishing of the LSD-wave, a comparatively high intensity of the laser beam inpulse can be chosen, without a fresh formation of an LSD-wave being effected.

The action of the atmosphere, containing hydrogen and/or helium and surrounding the surface of the location to be processed in accordance with the invention on the material removal process has been studied as compared with air or an atmosphere containing "other inert gases". (To be understood herein by "other inert gases" are unreactive gases such as nitrogen and rare gases with the exception of helium). The efficiency of a laser beam impulse upon the material removal proved to be substantially greater, in an atmosphere containing hydrogen and/or helium, than in air or in an atmosphere of "other inert gases". The cause of this increase in the efficiency lies presumably in collaboration of the lower density which allows a faster expansion of the LSD-wave, and the comparatively high ionisation energy of hydrogen and helium. In this way, the life of the LSD-wave is shortened by at least a factor of 2 and in the residual time portion of the laser beam impulse a comparatively high intensity, effective for the material removal of the laser beam impulse can be chosen without a further LSD-wave absorbing the laser radiation being formed.

The preferred arrangement of the surface of the location to be processed at a specific distance in front of the beam waist, leads also to a shortening of the life of the LSD-wave since this then passes more rapidly into regions with lower intensity.

So far as concerns use of the invention, the method in accordance with the invention, is used for drilling workpieces made of metals with degrees of reflection of over 95% upon infrared radiation of the wavelength of 10μm. In this connection, the degree of reflection is defined as the value calculated theoretically from the DC-conductivity in accordance with the Drude-Zener Theory and is also designated as "bulk-reflectivity" in contrast to the surface degree of reflection ("surface-reflectivity").

Exempliefied embodiments of the invention will be described in more detail hereinafter, by way of example, with reference to the attached drawings, in which.

Figure 1:
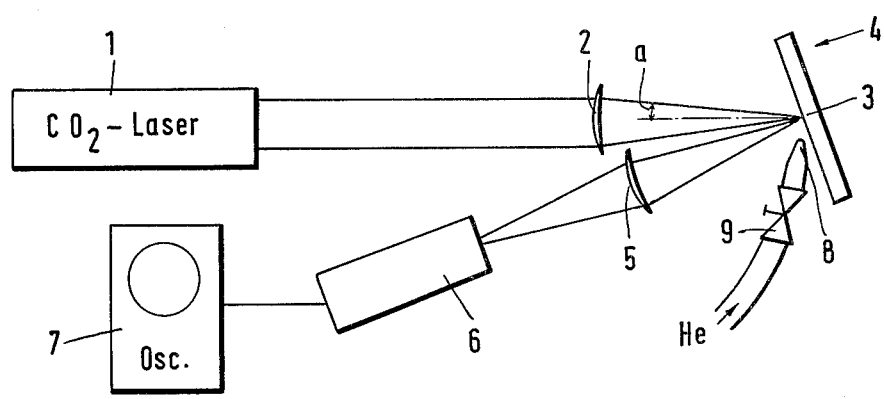
FIG. 1 is a schematic representation of an arrangement for drilling metallic workpieces in which the surface of the location to be processed of a workpiece is arranged in the region of the beam waist of the focused laser beam impulse.

The arrangement shown schematically in FIG. 1 comprises a TEA-$CO_2$-laser 1, a collective lens 2 which focuses a laser beam impulse, emitted by the laser 1, onto the surface of the location 3, to be processed, of a metallic workpiece 4 and a collective lens 5 which focuses that part of the laser beam impulse which is reflected from the location 3 onto a detector 6.

A cathode-ray oscillograph 7 serves for recording the detector signal. Directed at the location 3 is a nozzle 8 which is connected to a (non-depicted) gas cylinder filled with helium. The nozzle 8 may have a ring-shaped outlet aperture, arranged concentrically to the location 3, for the helium and a bore for the laser beam impulse.

The helium through-flow through the nozzle 8 is adjustable by means of a valve 9.

The $CO_2$-laser, not shown in more detail, comprises a discharge tube through which flows a laser gas mixture and in which two elongate electrodes, provided with so-called Rogowski profiles, are arranged symmetrically and parallel to the tube axis. A flashlight extends parallel to their intermediate space. The electrodes and the flashlight are connected to a controllable electrical impulse circuit. The gas mixture consists of carbon dioxide, nitrogen and helium as well as a small quantity of a gas with an ionisation potential below 7 eV, e.g. Ferrocen, to obtain a homogeneous pre-ionization by means of the flashlight. The discharge tube is closed off by two Brewster windows made of ZnSe. The resonator of the laser comprises a concavely arched, gold-plated metal mirror and a flat mirror, forming a decoupling mirror and coated with a reflection coating, made of germanium. A mode diaphragm is so arranged in front of the decoupling mirror that the laser beam impulse emitted from the $CO_2$-laser has a $TEM_{00}$ mode structure. The two Brewster windows arranged in the resonator produce a linear polarization of the laser beam impulse with a horizontal polarization plane. The wavelength λ of the laser beam impulse amounts to λ=10.6μm.

The collective lenses 2 or 5 respectively, consisting of zinc selenide or germanium, have focal lengths of 6.4 or 5 cm, respectively. The aperture angle a produced with the lens 2 amounts to 3.6°. It is dependent on the diameter of the laser beam and on the focal length of the lens. Larger aperture angles can be achieved, for example, by means of a telescope arranged between the laser 1 and the lens 2 for the beam widening. The surface, to be processed, of the workpiece 4 is inclined towards (or against) the direction of the laser radiation emitted by the laser 1, in such a way that the greater part of the laser beam impulse reflected from the processed location 3 is focused by the collective lens 5 onto the detector 6. If a perpendicular hole is to be drilled through the workpiece 4 and therefore the workpiece has to be arranged perpendicular to the laser radiation, a radiation divider can be arranged between the laser 1 and the collective lens 2 in order to guide the reflected light onto the detector 6. The detector 6 is an infrared detector, sensitive at a wavelength of 10μm, with a band width of at least 20 MHz, e.g. a photon-drag-detector.

There will be described hereinunder, with reference to FIGS. 2 and 3, a drilling method (or process) in which, with a single short laser beam impulse, an approximately 25μm deep parabolic depression with an outside diameter of 160μm is drilled. Depressions or holes passing through the workpiece can be drilled by means of repeated laser beam impulses, focused on the same location, of a $CO_2$-laser with a suitably selected impulse sequence frequency or long laser beam impulses.

The location 3, to be processed, of the workpiece 4 is first of all surrounded by means of a sufficient helium throughflow through the nozzle 8 with an atmosphere which contains at least 50% and preferably, over 90% helium and which is maintained right up to the end of the drilling process. Then, by means of the electrical impulse circuit of the laser 1, a laser beam impulse is released which is focused by the lens 2 onto the surface of the location to be processed.

In this respect, the rise time of the laser beam impulse is chosen so short against the impulse duration, the peak intensity is chosen so high and the aperture angle of the lens 2 or the effective aperture ratio thereof respectively (i.e. the ratio of the beam diameter to the lens focal length) is chosen so great that the LSD-wave, formed at the beginning of the interaction in front of the location 3 to be processed and absorbing the laser radiation, expands during less than a tenth of the impulse duration to such an extent out of the region in front of the location 3 to be processed that in this way in the further impulse course at the most, a negligible absorption of the laser radiation is brought about.

A corresponding dimensioning of the intensity course of the laser beam impulse is achieved by a suitable choice of the resonator arrangement of the laser 1, more especially of the degree of reflection (or reflectivity) of the decoupling mirror, the electrical discharge and the gas mixture.

In order to ascertain the occurrence, existance and expanding of an LSD-wave absorbing the laser radiation, the portion of the laser beam impulse which is reflected from the surface of the location 3, to be processed, of the workpiece 4 is measured with the detector 6 and the cathoderay oscillograph. The reflected radiation output (or capacity), initially increasing with the rise of the laser beam impulse, decreases upon the formation of an LSD-wave to less than the limit of measurement.

If the LSD-wave has expanded widely enough and it is not formed afresh, then the reflected radiation output again rises and achieves the value 0 only again at the end of the residual time portion of the laser beam impulse. On the other hand, if the LSD-wave is maintained, e.g. as a result of unsuitable choice of the focusing optical system (too small an aperture angle or too large a focal length), the intensity course or the ambient atmosphere at the location 3, than on the contrary, even in the residual time portion of the laser beam impulse, practically no reflected radiation output (or capacity) would be detected. The intensity course of the laser beam impulse is so selected that the reflected radiation, after a first rise in the first time portion of the laser beam impulse, drops to zero, then again increases and in the residual, longer portion of time of the laser beam impulse, reaches the value zero no longer (or more), i.e. only at the impulse end.

With the described laser 1, laser beam impulses which are repeatable according to duration and intensity course to ±10% can be obtained. Once the conditions for the production of a suitable laser beam impulse have been found, therefore, the method can be carried out on workpieces with a similar surface property (more especially the same reflectivity at a laser wavelength of 10.6 μm) without repeated measurement of the reflected laser beam impulse. The reflected radiation capacity can at all events, be measured periodically or in random manner for control.

Figure 2:
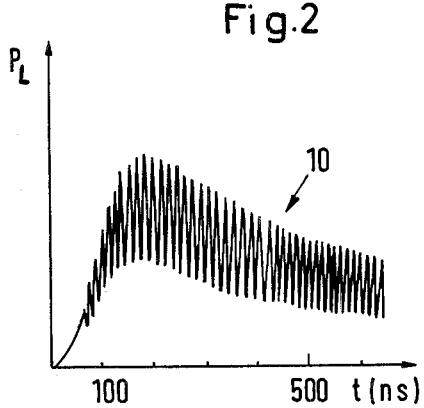
FIG. 2 is a graph illustrating a part of the timewise course of the radiation output of a laser beam impulse usable in the case of the method in accordance with the invention.

Shown in FIG. 2 is the beginning of the timewise course of the radiation capacity $P_L$ of a laser beam impulse 10 which has proved to be suitable for the removal of material from a workpiece made from highly reflecting metal, for example, copper. The laser beam impulse 10 has been produced by the above-described TEA-$CO_2$-laser 1, in which respect a decoupling mirror with a reflectivity of 95% and a gas mixture of 6% $CO_2$, 34% $N_2$ and 60% He with a Ferrocen addition, has been chosen. To produce the laser beam impulse 10, the UV-flashlight, consisting of a series of small spark gaps (or sparking distances), is ignited, so that the Ferrocen additive in the gas mixture is ionized. After a delay of a few microseconds, by means of a spark gap, a capacitor charged up to about 25 kV (or 15 nF) is discharged via the electrodes of the laser 1. Through the ionization of the Ferrocen additive, a homogeneous electrical discharge between the electrodes is achieved, so that the impulse 10 is reproducible to ±10%.

The impulse duration of the laser beam impulse 10 amounts to approximately 4 microseconds. In FIG. 2, merely the impulse course in the first 600 ns is shown. During the remaining part of the impulse duration the intensity further decreases approximately linearly. The radiation capacity $P_L$ rises at the impulse start suddenly, in a short, as against the impulse duration, time of under 200 ns to a peak capacity and then drops initially exponentially, then linearly. As a result of so-called "Mode-Beatings", the impulse has intensity fluctuations with a frequency of approximately 100 MHz. The peak capacity of the impulse 10 amounts to about 60 kW, its energy to about 40–50 Milli-Joule. The diameter of the laser beam in the focus of the lens 2, i.e. on the location 3 to be processed, amounts to about 100 μm. From this, there emerges a peak intensity of the laser beam impulse in the focus of the few $10^8$ $W/cm^2$.

Figure 3:
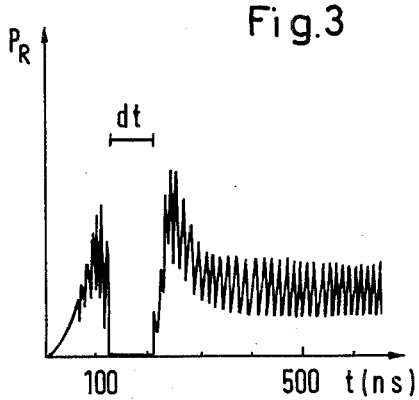
FIG. 3 is a graph showing part of the timewise course of the radiation output of the laser beam impulse, reflected back from the processed location which is surrounded by a helium atmosphere of the metallic workpiece, in accordance with FIG. 2.

Shown in FIG. 3 is the timewise course of the radiation capacity $P_R$ of that portion of the laser beam impulse 10 which is reflected from the location 3, focused by means of the lens 5 onto the detector 6 and recorded by the cathode-ray oscillograph 7. In this respect, the location 3 has been surrounded prior to, and during the release of the laser beam impulse 10 by means of an adequate helium through-flow through the nozzle 8 with an atmosphere consisting almost completely of helium.

Upon the rise of the laser beam impulse 10, the reflected radiation capacity $P_R$ initially increases, until a plasma forms upon sufficiently high intensity of the impulse directly in front of the location 3. The immediately following portion of the laser beam impulse 10 is absorbed by the plasma, whereby this is heated up and heats an uppermost material layer at the location 3 by the heat conduction right into the region of the melting point of the metal. On account of the absorption of the laser beam impulse in the plasma, the capacity $P_R$ drops to zero. There is formed an LSD-wave which expands during a time dt of about 100 ns out of the region in front of the location 3 and after that is exposed only to such a slight radiation density, that it is extinguished and becomes transparent for the laser radiation. The capacity $P_R$ therefore decreases again.

Through the laser radiation falling again onto the workpiece 4, the location 3 to be processed is heated up to above boiling point. In the metal vapour flowing off there is then formed (in contrast to the LSD-wave) a stationary plasma which absorbs the greater part of the laser radiation, namely so close in front of the location 3 to be processed, that a good heat contact arises and laser energy is transmitted, right up to the end of the laser beam impulse 10, effectively into the workpiece 4. In this connection, the intensity is so dimensioned that a radial pressure gradient is produced in the partially vaporized material which is sufficient to expel liquid material.

After the time dt, the capacity $P_R$ gradually decreases, which (as has been said) cannot be to the formation of a new LSD-wave (the capacity $P_R$ in this connection does not reach the value zero again), but is a result of the vapour emerging from the material and of the stationary plasma, which partially absorb the laser radiation or deflect it in the region comprehended by the exterior of the lens 5.

Figure 4:
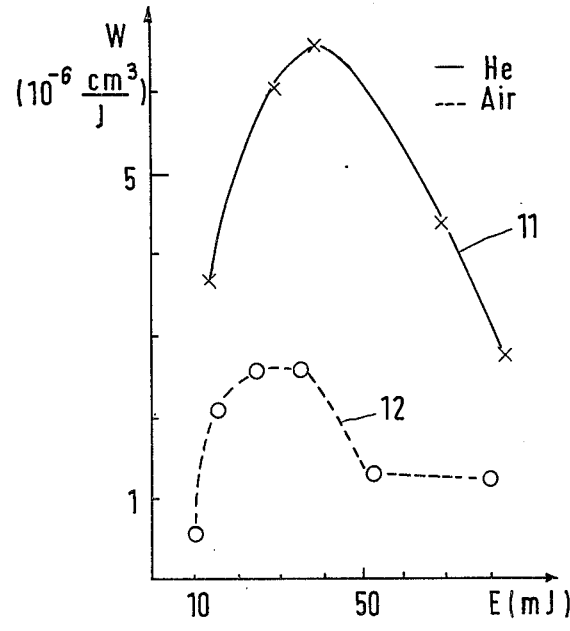
FIG. 4 is a graph showing efficiency of material removal as a function of the energy of the laser beam impulse for a helium atmosphere and an air atmosphere surrounded the processed location of the workpiece.

Shown in FIG. 4 is the efficiency W of removal of material from a copper workpiece as a function of the impulse energy E. The impulse length and the impulse shape of the laser beam impulses of different energy have been selected the same in the case of the measurements underlying FIG. 4, namely in accordance with the laser beam impulse 10 in FIG. 2. To reduce the impulse energy E, between the laser 1 and the lens 2, attenuators have been brought into the beam course. The solid curve 11 plots the effeciency W in the case of a helium atmosphere surrounding the processed location 3, and the broken curve 12 in the case of an air atmosphere. The optimum efficiency achievable with the lens 2 (focal length 6.4 cm) is achieved in a helium atmosphere at an impulse energy of 40 to 50 mJ, i.e. using the laser beam impulse 10 in accordance with FIG. 2.

The reason for the smaller efficiency in the case of air as compared with helium lies in the fact that the time dt, during which the plasma absorbing the laser radiation expands out of the focus, in air is at least twice as long as in helium, so that the evaporation of the material, i.e. the process of the removal of material (e.g. the drilling process) starts substantially later than in a helium atmosphere. In addition, the location to be processed cools down more severely during the time dt which is longer in the case of the processing in air. The lower efficiency in the case of impulse energies under about 30 mJ is probably caused by the fact that the radiation intensity which is at least necessary for maintaining the drilling process is available during too short an interval of time. The lower efficiency in the case of impulse energies above, about 60 mJ (or at high radiation capacities) is caused by the fact that the LSD-wave as a result of the high intensity in the remaining portion of time of the laser beam impulse has too high a degree of absorption or in the residual portion of time of the laser beam impulse an LSD-wave is ignited afresh in front of the location 3.

For checking the occurrence and the existence of the LSD-wave, instead of the reflected laser radiation ($P_R$ in FIG. 3) also the electromagnetic radiation omitted by the LSD-wave can be measured, advantageously in a special range which lies outside the emission spectrum of the glowing metal or of the metal vapours as well as of the laser radiation.

Instead of helium, the location to be processed can also be surrounded with hydrogen, similar efficiencies being achieved. If hydrogen is used, then, to avoid explosion risk, at least the workpiece 4 must be enclosed with a (not depicted) gastight chamber, which, along with exclusion of oxygen, is filled with an atmosphere which contains at least 50% hydrogen. The chamber can, of course, alternatively be filled with helium. Furthermore, the chamber has, in the incident beam course through the lens 2 and in the beam course falling-out through the lens 5, respectively, a window which is transparent for the laser radiation.

The arrangement shown in FIG. 5 consists of the $CO_2$-laser 1 described in more detail in connection with FIG. 1, a collective lens 13 which focuses the laser beam impulse, and the workpiece 14 to be processed. The lens 13 has a focal length, which is greater compared with the lens 2 in accordance with FIG. 1, of f=12.5 cm. Accordingly, the aperture angle a′, arising from the radius of the laser beam impulse at the location of the lens 13 of R=4 mm and the focal length f=12.5 cm, of the focused laser beam impulse is smaller than the aperture angle a (FIG. 1) and amounts to merely a′=1.8°. The envelope 15 of the focused beam has, as indicated in FIG. 6, the form of the generated surface of a hyperboloid of one sheet. The beam waist 16, that is, the narrowest point of the envelope 15, lies approximately in the focal plane 17 of the lens 13. The radius w of the beam waist is calculated from $$w = \lambda / \pi \cdot tg\ a'$$

for w=107 μm, in good correspondence with an experimentally measured value of w=106 μm. The surface 18 of the location, to be processed, of the metallic workpiece 14 is arranged between the lens 13 and the beam waist 16 of the focused laser beam perpendicular to the optical axis 19 of the lens 13. The distance d of the surface 18 from the beam waist 16 or the focal plane 17 is dimensioned in accordance with the formula:

$$d = k \cdot w / tg\ a'$$

Therein, k is a factor determined empirically at 0.7. From this there emerges a distance d of 2.4 mm. The surface 18 is thus arranged at a spacing d which is small relative to the focal length f (the distance d amounts to 1.9% of the focal length f) in front of the focal plane 17 of the lens 13. A nozzle (not shown) charged with helium gas is directed at the surface 18 to be processed.

For the drilling of the workpiece 14, initially the location of the beam waist 16 of the focused laser beam impulse is determined. This can be carried out experimentally, for example, as follows. A piece of plexiglass is displaced step-by-step along the optical axis 19. Upon each step, side-by-side, two holes are drilled with laser beam impulses of different, as small as possible energy. These two holes are each surrounded by a swelling zone whose outside diameters $D_1$ and $D_2$ are linked with the beam radius R of the laser beam at the relevant location of the optical axis 19 by the equation:

$$2R^2 ln(E_1/E_2) = D_1{}^2 - D_2{}^2.$$

Therein, $E_1$ and $E_2$ signify the energies of the two laser impulses with which the holes have been produced. The beam waist 16 is located at the location of the optical axis 19 at which the smallest beam radius R is measured. There w=R applies. Then the distance d is calculated in accordance with the formula:

$$d = k \cdot w / tg\ a',$$

wherein k=0.7 and the surface 18 of the location, to be processed, of the workpiece 14 is arranged at the distance d in front of the beam waist 16. The surface 18 is then surrounded with an atmosphere which contains at least 50% helium and the drilling process is initiated by releasing a laser beam impulse, as is explained in conjunction with FIGS. 1 to 4.

For drilling deep holes by means of several consecutive laser beam impulses, either the workpiece 14 can be shifted continuously or stepwise after each laser beam impulse in the directiion of the arrow 20 towards the lens 13, or the latter can be moved in the direction of the arrow 21 towards the workpiece 14, in such a way that the surface 18 of the location to be processed, upon the impingement of each laser beam impulse, at all times, lies at the distance d in front of the beam waist 16.

In FIG. 6, the experimentally-determined course of the efficiency W, defined by the ratio of the volume of the removed material to the energy of the laser beam impulse, of the material removal is recorded as a function of the distance d of the surface 18 from the beam waist 16. Copper has been selected as the material. The maximum of the efficiency W is achieved when the surface 18 is arranged at the spacing d=2.4 mm in front of the beam waist 16. When the surface 18 is arranged in the beam waist 16 (d=0), merely 60% of the maximum efficiency is achieved.

Figure 5:
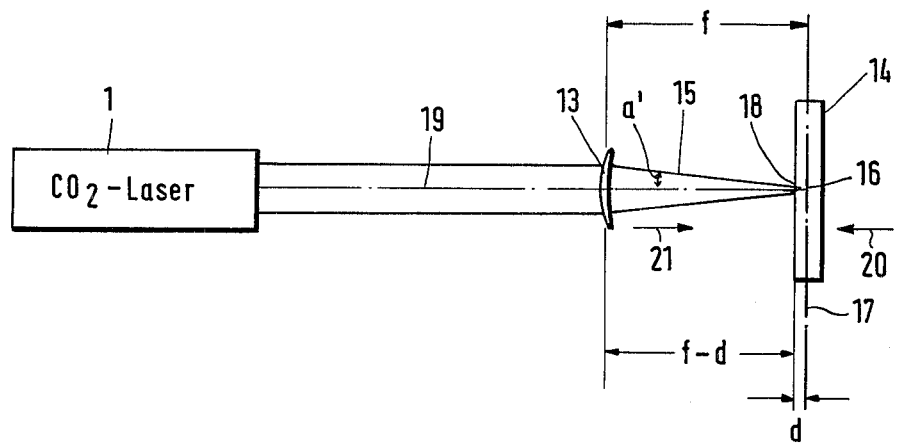
FIG. 5 is a schematic representation of a second arrangement for drilling metallic workpieces in which the surface of the location to be processed of the workpiece is arranged at a spacing in front of the beam waist of the focused laser beam impulse.
Figure 6:
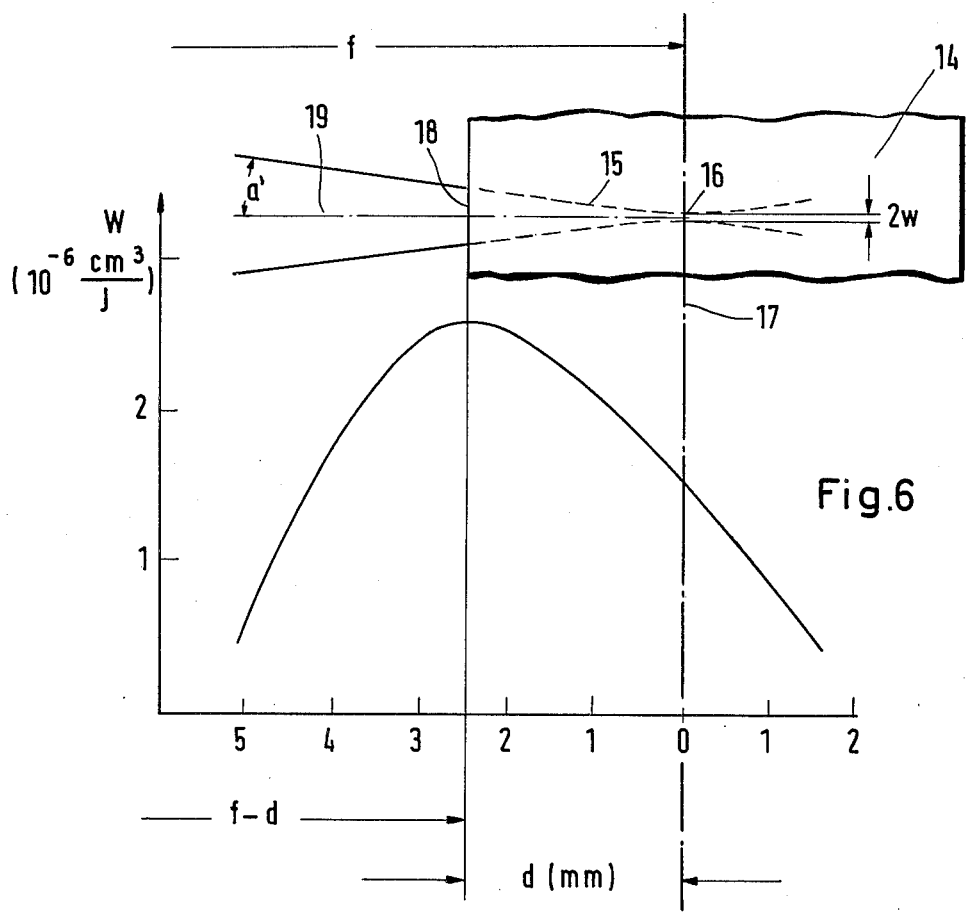
FIG. 6 is a graph showing efficiency of material removal as a function of the distance of the surface of the location, to be processed, from the beam waist and a schematic representation of the envelope of the focused laser beam impulse in this spacing region (or range).

The efficiency W achieved with the arrangement in accordance with FIG. 5 in the region of the beam waist is therefore, smaller than the efficiency W achieved with the arrangement in accordance with FIG. 1, because the aperture angle a' achieved with the lens 13 is smaller than the aperture angle a achieved with the lens 2.

The factor k is dependent on the type of the atmosphere which surrounds the surface of the location to be processed. In a vacuum, in which no LSD-wave forms, k is equal to 0, and in air k=1.4. Various experiments have shown that the factor k in helium lies between 0.6 and 0.8.

The terms and expressions which have been employed herein are used as terms of description and not of limitation, and there is no intention, in the use of such terms and expressions, of excluding any equivalents of the features shown and described or portions thereof, but is recognized that various modifications are possible within the scope of the invention claimed.

We claim:

1. A method of removing material from a metallic workpiece, more especially drilling, by means of a focused laser beam impulse of a pulsed infrared laser, more especially a $CO_2$-laser, characterized in that the surface of the location, to be processed, of the workpiece is arranged in the beam waist of a focused laser beam impulse or at a spacing (d) in the propagation direction of the laser beam impulse in front of the beam waist and is surrounded with an atmosphere containing helium and/or hydrogen, and the timewise intensity course of the laser beam impulse is so dimensioned and the laser beam impulse is focused at such a large aperture angle that an expanding plasma, absorbing the laser radiation, is formed at the start of the laser beam impulse in front of the location to be processed, but is maintained only during a fraction of the laser beam impulse.

2. A method as claimed in claim 1, characterized in that the surface of the location, to be processed, of the workpiece is arranged at a spacing d, in the propagation direction of the laser beam impulse in front of the beam waist, in which respect at least approximately:

$$d = k \cdot w / tg\ a,$$

wherein k=0.1 to 2.0, w is the radius of the beam waist, and a is the aperture angle of the focused laser beam impulse.

3. A method as claimed in claim 2, characterized in that k=0.2 to 1.0.

4. A method as claimed in claim 2, characterized in that k=0.5 to 0.9.

5. A method as claimed in claim 2, characterized in that several consecutive laser beam impulses are produced for the gradual (or stepwise) removal of material, and the workpiece of the beam waist is shifted after impingement of each laser beam impulse in such a way that the surface of the respective location to be processed, of the workpiece, upon the impingement of each laser beam impulse is disposed at the spacing d in front of the beam waist.

6. A method as claimed in claim 1, characterized in that the radiation capacity ($P_R$) at least of a part of the laser beam impulse reflected from the location, to be processed, of the metallic workpiece is measured as a function of time and the timewise intensity course of the laser beam impulse is so selected that the reflected radiation capacity ($P_R$), first of all increasing upon the rise of the laser beam impulse, decreases as a result of the formation of the expanding plasma, absorbing the laser radiation, at least approximately to zero, and then increases again as a result of extinguishing of this expanding plasma.

7. A method as claimed in claim 1, characterized in that the radiation capacity of the electro-magnetic radiation emitted by the absorbing expanding plasma formed in front of the location to be processed is measured in a spectral range lying outside the emission spectrum, occurring upon the material removal of the glowing metal, or of the metal vapours, respectively, as well as of the laser radiation and the timewise intensity course of the laser beam impulse is so selected that the measured radiation capacity first of all, increases as a result of the formation of the expanding plasma absorbing the laser radiation, and then decreases once more as a result of the extinguishing of this plasma.

8. A method as claimed in claim 1, characterized in that the atmosphere surrounding the surface of the location to be processed, contains at least 50% helium and/or hydrogen.

9. A method as claimed in claim 1, characterized in that the atmosphere surrounding the surface of the location to be processed, consists of at least 90% helium.

10. A method as claimed in claim 1, characterized in that the intensity course of the laser beam impulse is so selected that the intensity thereof rises rapidly to a peak intensity and then falls away.

11. A method as claimed in claim 1, characterized in that the rise time of the laser beam impulse is selected to be so short against the impulse duration and the peak intensity is selected to be so large that the expanding plasma absorbing the laser radiation expands during a fraction of the impulse duration out of the region in front of the location to be processed.

12. A method as claimed in claim 11, characterized in that the intensity of the laser beam impulse during the residual period of time, is dimensioned to melt the material to be removed and to achieve a radial pressure gradient, expelling molten material, of the partially evaporated material.

13. A method as claimed in claim 1, characterized in that an at least approximately periodical oscillation is superimposed on the intensity course of the laser beam impulse.

14. A method as claimed in claim 1, characterized in that the intensity course of the laser beam impulse is so selected that the maximum radiation density in front of the location to be processed in a first portion of time of the laser beam impulse is greater than $10^8$ W/cm$^2$.

15. A method as claimed in claim 1, characterized in that the impulse duration of the laser beam impulse amounts to several microseconds.

16. A method as claimed in claim 1, characterized in that the diameter of the beam waist amounts to between 80 and 150 micrometers, the energy of the laser beam impulse amounts to at least 10 Milli-Joule and the peak capacity of the laser beam impulse amounts to at least 5 kW.

17. A method as claimed in claim 1, characterized in that the laser beam impulse is focused at an aperture angle of at least 2°.

18. A method as claimed in claim 1, in which material is removed from workpieces made of metals or alloys whose reflectivity at infrared radiation of the wavelength 10.6 μm amounts to over 95%, or from workpieces which are coated with a layer of such metals or alloys.

19. Apparatus for removing material from a metallic workpiece, more especially drilling, comprising a pulsed infrared laser, a focusing optical system for focusing the laser impulse onto or at a spacing (d) behind the surface of the location on the workpiece to be processed, and means adapted to surround the location on the workpiece to be processed with helium and/or hydrogen; said laser being adapted to emit impulses with a rise-time which is so short against the impulse duration and with a peak intensity at the end of the rise-time which is so large and said focusing optical system having such a small focal length that a laser supported detonation wave is formed at the start of the laser impulse in front of said surface, but is maintained only during a small fraction of the laser impulse.

20. Apparatus as claimed in claim 19, in which said infrared laser is a pulsed CO$_2$-laser, more especially a TEA-CO$_2$-laser.

21. Apparatus as claimed in claim 19, in which said focusing optical system is a collective lens with a focal length of at the most, a few centimeters.

22. Apparatus as claimed in claim 20, in which said pulsed infrared laser includes a laser resonator so designed that the laser beam impulse has a TEM$_{00}$-mode structure.

23. Apparatus as set forth in claim 19, in which said focusing optical system is arranged in such a position, that the beam waist of the focused laser beam impulse lies at a distance d in the propagation direction of the laser impulse behind the site for arranging the surface of the location of the workpiece to be processed, said distance d being at least approximately:

$$d = k \cdot w / tg\ a,$$

wherein k=0.1 to 2.0, w is the radius of the beam waist and a is the aperture angle of the focused laser beam impulse.

* * * * *